G. C. FLAGG.
CHECK-ROW ATTACHMENT FOR CORN-PLANTERS.
No. 169,980. Patented Nov. 16, 1875.
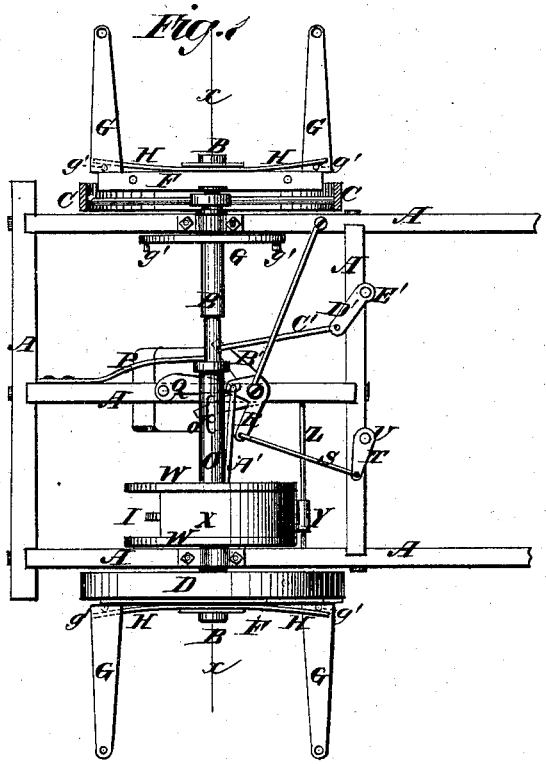
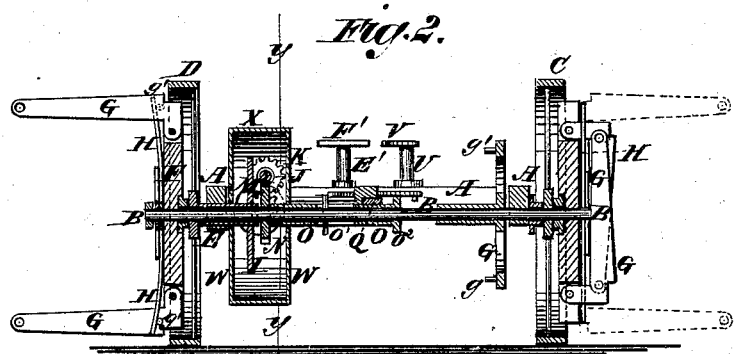
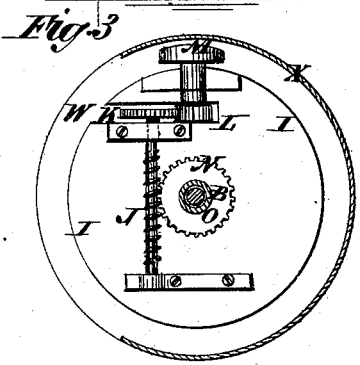
WITNESSES:
Francis McArdle.
N. F. Terry
INVENTOR
Geo. C. Flagg
BY
ATTORNEYS.

UNITED STATES PATENT OFFICE.

GEORGE C. FLAGG, OF COLUMBUS, ILLINOIS.

IMPROVEMENT IN CHECK-ROW ATTACHMENTS FOR CORN-PLANTERS.

Specification forming part of Letters Patent No. 169,980, dated November 16, 1875; application filed July 17, 1875.

*To all whom it may concern:*

Be it known that I, GEORGE C. FLAGG, of Columbus, in the county of Adams and State of Illinois, have invented a new and useful Improvement in Check-Row Attachment for Corn-Planters, of which the following is a specification:

Figure 1 is an under-side view of the frame and wheels of a cultivator to which my improvement has been applied. Fig. 2 is a vertical cross-section of the same, taken through the line $x\ x$, Fig. 1. Fig. 3 is a detail section taken through the line $y\ y$, Fig. 2.

Similar letters of reference indicate corresponding parts.

The invention relates to a machine designed for attachment to corn-planters for marking off the ground to enable the corn to be planted in accurate check-row.

The invention consists in the construction and arrangement of parts, as hereinafter described and claimed.

A is the frame of the planter, in bearings attached to the side bars of which the axle B revolves. C D are the wheels, one, C, of which revolves loosely upon the axle B, and the other is rigidly attached to the outer end of a sleeve, E, through which the axle B passes, and which revolves upon the said axle. To the ends of the axle B, upon the outer side of and close to the wheels, is attached a cross-bar, F, to the ends of which are hinged two arms, G. More than two arms G may be used, if desired; but in all cases the sum of the distance between the arms must equal the circumference of the wheels. The arms G may be turned out at right angles to the cross-bars F, or folded in, to lie along the said cross-bars. The arms G are so formed that, when opened out, their outer edges may be flush with the faces of the wheels C D, so as to mark the ground as the machine is drawn forward. To the ends of the axle B are pivoted the centers of the springs H, the ends of which, when the arms G are extended, are sprung upon the pins $g'$, attached to said arms G, to hold them extended, and the elasticity of which allows said arms to accommodate themselves to any unevenness in the surface of the ground. The ends of the springs H are slipped off the pins $g'$ when the arms G are to be folded down.

Any other suitable device that will hold the arms G extended, and allow said arms to accommodate themselves to the surface of the ground, may be used.

To the inner end of the sleeve E is rigidly attached a disk, I, to the side of which is swiveled an endless screw, J. To one end of the screw J is rigidly attached a small gear-wheel, K, the teeth of which mesh into the teeth of the smaller gear-wheel L, attached to the end of the journal of the friction-wheel M, which is pivoted to the side of the disk I. N is a screw-wheel, attached to the end of the sleeve O, which is slotted longitudinally to receive a pin, $o^1$, which passes through the axle, so that the said axle and sleeve may revolve together, while the sleeve may be free to slide longitudinally upon the axle, to throw the screw-wheel N into and out of gear with the screw J. Upon the end of the sleeve O is formed a collar, $o^2$, to receive the spring P, by which it is moved to throw the wheel N into gear with the screw J, and to receive the lever Q, by which it is moved outward to throw the wheel N out of gear with the screw J. The lever Q is operated by the free arm of the bent lever R, which is pivoted at its angle to a cross-bar of the frame A, and to the end of the other arm of which is pivoted the end of the rod S. The forward end of the rod S is pivoted to the crank-arm T, attached to the lower end of a short vertical shaft, U, that works in bearings attached to the forward cross-bar of the frame A, and to the upper end of which is attached a foot-lever, V.

By this construction the driver, with his foot, can throw the screw-wheel N out of gear with the screw J when desired.

W are two disks, placed upon the axle B, at a distance apart a little greater than the diameter of the friction-wheel M, and which are connected together and held at the proper distance apart by being connected at their rims by a band or shell, X. The disks W are kept from turning upon the axle B by being connected by an eye, Y, with a rod, Z, attached to the frame A, and upon which the said eye Y slides. To the inner disk W is attached the end of a rod, A', the other end of which is attached to the arm of the bent lever B', which is pivoted at its angle to a cross-bar of the frame A, and to its other end is pivoted the end of a rod, C', the other end of which is pivoted to a crank, D', attached to the lower end of a short vertical shaft, E', that works in bearings attached to the front cross-bar of the frame A, and to the upper end of which is attached a double foot-lever, F'.

The double foot-lever F' is so arranged that when at right angles with the length of the machine the friction-wheel M may be midway between the two disks W, so that by turning the said lever F' in one or the other direction, one or the other of the said disks W may be brought into contact with said friction-wheel M to turn the screw J, and thus adjust the markers F G H, should they get out of position with respect to the previous marks or rows by the slipping of the machine or from other cause.

The friction-wheel M may, if desired, be replaced by a gear-wheel, meshing into gear-teeth formed upon or attached to the inner sides of the disks W.

To the axle B is rigidly attached a wheel, G', which is designed to serve as a hand-wheel for adjusting the markers and dropping devices when starting in at the side of the field, and which is provided with pins g', for operating the seed-dropping device.

With this construction the wheels C D mark the rows in one direction, and the marker-arms G mark it in the other direction, the machine being so guided that the ends of the inner markers may meet, or nearly meet, the ends of the marks made by the outer markers upon the previous crossing, so that the ground is marked in accurate check-row by the machine crossing the field in one direction.

Having thus described my invention, I claim as new and desire to secure by Letters Patent—

1. The L-shaped arms G, hinged to the ends of cross-bars F, fixed on the axle, and springs H, for holding the same extended horizontally from the wheels, as shown and described.

2. The combination of the parallel disks W W, and rod and lever for adjusting them on the axle, with the friction-wheel M, as shown and described, for the purpose specified.

3. The combination of the sleeve E, the disk I, the swiveled screw J, the gear-wheels K L, the two movable disks W, the screw-wheel N, and the sleeve O with the drive-wheel D, the axle B, and the markers F G H, substantially as herein shown and described.

GEORGE CORNER FLAGG.

Witnesses:
G. E. WHITLOCK,
H. BROWNRIGG.